United States Patent
Novak et al.

(10) Patent No.: US 6,293,788 B1
(45) Date of Patent: Sep. 25, 2001

(54) THERMAL PROCESSING UNIT FOR THE PREPARATION OF PLASTISOL-BASED FLOOR COVERINGS

(75) Inventors: Lawrence J. Novak, Boothwyn, PA (US); Peter J. Rohrbacher, Bordentown, NJ (US); Rudolph Kist, III, Elkton, MD (US)

(73) Assignee: Congoleum Corporation, Mercerville, NJ (US)

(*) Notice: Subject to any disclaimer, the term of this patent is extended or adjusted under 35 U.S.C. 154(b) by 666 days.

(21) Appl. No.: 08/713,672

(22) Filed: Sep. 17, 1996

Related U.S. Application Data

(63) Continuation-in-part of application No. 08/609,693, filed on Mar. 1, 1996.

(51) Int. Cl.$^7$ .................................................. F27B 3/20
(52) U.S. Cl. .............................. 432/175; 432/147; 34/420
(58) Field of Search ................................. 432/239, 243, 432/246, 121, 128, 136, 137, 141, 146, 147, 153, 163, 175; 34/420, 421, 423

(56) References Cited

U.S. PATENT DOCUMENTS

| | | | |
|---|---|---|---|
| 3,293,094 | 12/1966 | Nairn et al. | 156/79 |
| 3,623,235 | 11/1971 | Smith | 34/48 |
| 4,127,945 | 12/1978 | Nothen et al. | 34/421 |
| 4,611,989 | 9/1986 | Kersting | 432/121 |
| 4,733,481 | 3/1988 | Hubbert | 34/243 C |
| 4,744,750 | 5/1988 | Lingl, Jr. | 432/137 |
| 4,756,091 | 7/1988 | Van Denend | 34/4 |
| 4,761,894 | 8/1988 | Hamasaki et al. | 34/39 |
| 4,785,552 | 11/1988 | Best | 34/30 |
| 4,790,749 | 12/1988 | Mauro | 432/175 |
| 4,792,302 | 12/1988 | Baker et al. | 432/175 |
| 4,936,025 | 6/1990 | Heikkila | 34/420 |
| 4,942,674 | 7/1990 | Karlsson | 34/421 |
| 5,009,016 | 4/1991 | Lepisto et al. | 34/421 |
| 5,147,083 | 9/1992 | Halstead et al. | 432/77 |
| 5,263,265 | 11/1993 | Melgaard | 34/421 |
| 5,299,362 | 4/1994 | Baldinger | 34/421 |
| 5,319,861 | 6/1994 | Tate | 34/267 |
| 5,345,061 | 9/1994 | Chanasyk et al. | 219/388 |

FOREIGN PATENT DOCUMENTS

| | | |
|---|---|---|
| 0 168 332 | 5/1990 | (EP) . |
| 1047469 | 11/1966 | (GB) . |

OTHER PUBLICATIONS

"Omegascope IIA—Infrared Temperature Measurement and Control System," catalog pp. C1–24 to C1–34 (publication date unknown).

"Marsden Gas Infrared Drying System for the Pulp & Paper Industry, For the highest infrared output . . . ," brochure (1991).

"Drying, Gelling and Vulcanizing Tunnels," brochure in the German language (translation unavailable), (publication date unknown).

"Noncontact temperature measurement for quality process monitoring and control," Raytek brochure, pp. 1–12 (publication date unknown).

"Gas Infrared systems for the Pulp & Paper Industry, Preheating . . . ," brochure (1994).

*Primary Examiner*—Jiping Lu
(74) *Attorney, Agent, or Firm*—Synnestvedt & Lechner LLP

(57) ABSTRACT

A thermal processing unit for the processing of plastisol-based floor coverings comprising a radiant heat transfer section which raises the temperature of a plastisol-based floor covering to an approach temperature followed by a convection heating section which raises the temperature of the plastisol-based floor covering to a predetermined target temperature.

22 Claims, 9 Drawing Sheets

THERMAL PROCESSING UNIT FOR THE PREPARATION OF PLASTISOL-BASED FLOOR COVERINGS

This Application is a continuation in part of U.S. Ser. No. 08/609,693 filed Mar. 1, 1996.

This invention is directed to a thermal processing unit used in the preparation of plastisol-based surface coverings. More particularly, the present invention relates to a thermal processing unit which utilizes a radiant heat transfer section followed by a convection heat transfer section for processing selectively foamed resilient plastisol-based surface covering products.

Resilient floor coverings generally incorporate a foamed or cellular layer, and most commonly a foamed PVC layer. Such products are particularly popular in the flooring industry because the "foamed" layer provides a very comfortable walking surface that can be easily incorporated into an attractive design. The foamable layer of such resilient flooring products is conventionally produced by coating onto a substrate or base material a foamable PVC plastisol.

In general, foamable plastisols incorporate a foaming agent that causes the plastisol to take on a cellular or foam structure when the plastisol is properly processed. The most common form of foaming agent is a blowing agent, which is a compound or a combination of compounds that decompose at an elevated temperature to evolve a gas which causes the plastisol to expand or "foam." Examples of possible blowing agents which may be used in the practice of the present invention are provided in U.S. Pat. No. 3,293,094 to R. Frank Nairn et al, which is incorporated herein by reference. Blowing agents are often used in conjunction with an accelerator for the blowing agent, which is a material which lowers the temperature at which the blowing agent normally decomposes.

A conventional process for preparing chemically embossed resilient flooring utilizing a foamable plastisol is represented schematically in FIG. 1. As illustrated in FIG. 1, a base material, such as compressed felt, referred to in the art as the "web", is introduced into an apparatus which applies a foamable plastisol coating. The applied plastisol coating is usually a viscous fluid and is prone to retaining dirt or other material that contacts the coating. After the foamable plastisol is applied to the substrate, it is heated to a temperature at which the plastisol gels. In the conventional processes, however, the heating of the plastisol to form the plastisol gel must not result in blowing, otherwise the steps commonly utilized to produce selective foaming (e.g., embossing) will be ineffective, as explained below. To accomplish gellation, therefore, the flooring product is conveyed to a gellation apparatus which is capable of gelling the plastisol without initiating blowing.

This gellation step has generally been accomplished by the use of convection heating ovens which raise the temperature of the foamable plastisol coating to the plastisol's gel point.

Once the flooring product has undergone gellation, it is conveyed to an inhibitor printing apparatus. Here the surface of the gelled plastisol is selectively coated with an inhibitor. The inhibitor is frequently incorporated into an "inhibitor ink," which is a pigmented or unpigmented liquid applied in a design to the gelled plastisol by printing or coating equipment. The inhibitor ink reduces the extent of foaming which takes place in those regions of the gelled plastisol underlying the surface areas in which the ink has been applied, as is well known in the art. In general, the inhibitor includes an agent which passes into the gelled plastisol and deactivates the accelerator so that when the composite is heated to a temperature above the gellation temperature to fuse the plastisol and decompose the blowing agent, those regions of the plastisol that are printed with the embossing composition are not expanded.

After gellation and printing, the flooring product is conventionally conveyed to an apparatus which applies a wearlayer coating, such as a non-foamable PVC plastisol. Following application of the wearlayer coating, the flooring product is conveyed to an apparatus capable of blowing or foaming the foamable plastisol. Fusion of the plastisol components also generally takes place in this unit. This blowing and fusion step has generally been accomplished by the use of convection ovens wherein the temperature of the flooring product is raised to a temperature in excess of the gellation temperature of the foamable plastisol causing the blowing agents present in the plastisol to be activated. When the blowing agents are activated they cause an expansion in the foamable plastisol such that regions of the plastisol which have not been printed with the inhibitor ink are elevated relative to the regions which have been printed with the inhibitor. The presence of the inhibitor thus results in an embossed appearance of the flooring product and the resulting flooring product is known in the art as a chemically embossed resilient flooring product.

Although the process represented in FIG. 1 has produced desirable flooring products, there is a significant problem with this process in that during the gellation stage the flooring product can be ruined by premature blowing of the plastisol. If the plastisol blows prior to application of the inhibitor, the flooring product is unacceptable for further processing and must be scrapped. The primary cause of undesirable blowing at the gellation stage is a high temperature excursion in the oven used to cause gellation.

In addition to premature blowing, the use of convective heating alone to gel and fuse a flooring product has other undesirable characteristics which result in significant costs to the manufacturer. For example, ovens which utilize convective heating systems exhibit a rate of heat transfer which is undesirably low. This is because heat transfer in such units is determined, at least in part, by the impingement velocity of the air circulated in the oven and by the difference in temperature between the air and the temperature of the product. In the processing of foamable plastisols to cause gellation and fusion, the impingement velocity must be kept low to avoid disturbing the wet surface of the applied coating. This not only slows processing of the product, it results in ovens that are very large and expensive. Convective ovens of the type heretofore used may be 180 feet long or longer. Accordingly, applicants have recognized that the wet state of the foamable gel has caused severe limitations in the rate of convective heat transfer available according to prior art gellation and fusion processes.

In addition to the above disadvantages, the impinging air used in the convection oven also tends to deposit residue such as condensed or carbonized plasticizer from previous processing runs onto the wet, plastisol coating. This can dramatically decrease production efficiency since contamination which is deposited on the plastisol often results in substandard flooring product that must be scrapped.

On the other hand, applicants have recognized that significant disadvantages are associated with the use of radiant heat transfer systems to gel and fuse foamable plastisols. For example, radiant heat transfer systems are difficult to precisely regulate due to the heat transfer rate's dependence on the fourth power of the temperature difference between the emitter and the target. For gray bodies, for example, the heat transfer rate (es: BTU/hr) is related to the temperature of the emitter and the target as follows:

$$Q_{net} = C[(T_t)^4 - (T_e)^4]$$

$Q_{net}$=net heat transfer where C=constant for the bodies in the system
$T_t$=temperature of the target
$T_e$=temperature of the emitter As an example, a change in the difference in temperature between the emitter and the target of 5% will result in an approximate heat transfer change of about 20%. Furthermore, for radiant heat provided by infrared (IR) sources, differences in infrared emission characteristics among the heat sources also causes control difficulties. Because radiant heat sources can be difficult to regulate and control, the product temperatures in these types of ovens can easily exceed the target gellation and fusion temperatures. When the target temperatures are exceeded during gellation, premature blowing can result. When the target temperatures are exceeded during fusion, overblowing can occur, resulting in elimination or distortion of the pattern created by chemical embossing. Such results have disastrous consequences for the flooring manufacturer in terms of equipment down-time and yield of acceptable product.

The present invention is based, at least in part, on applicants' discovery that a thermal processing unit which performs radiant and convection heating in isolation and sequentially can be configured to advantageously eliminate the problems encountered in prior units used in the manufacture of floor covering materials and results in faster production of higher quality flooring product at lower costs than conventional oven systems.

The higher quality of the flooring product produced by the present invention is based in part on the lack of contamination of the product. Particulate materials, such as; condensed or carbonized plasticizer, are carried in the impinging air of a convection oven and are deposited on the wet surface layer of the flooring product, resulting in substandard product that must be scrapped. Accordingly, reduction in the time during which the product is exposed to convection gases reduces the level of contamination of the product, resulting in cleaner, and therefore, higher quality product. The thermal processing unit of the present invention reduces exposure to convection gases by first utilizing a radiant heat section that quickly raises the temperature of the product.

An additional advantage provided by the thermal processing units of the present invention is that the product temperature can be strictly regulated. This improved control avoids premature activation of blowing agents during gellation and avoids overblowing during fusion. This level of control reduces irregularities due to partial blowing or overblowing which distort the printed pattern on the flooring products.

A further advantage of the present invention is that the thermal processing units can be smaller in size than conventional convection ovens. The small size of these thermal processing units require less space than conventional processing ovens and reduces the costs associated with buying or leasing space for a production facility.

SUMMARY OF THE INVENTION

The preferred aspects of the present invention provide a thermal processing unit for the processing of an plastisol-containing article used in the manufacture of plastisol-based surface covering products. The preferred unit comprises a radiant heat transfer section for raising the temperature of the article at a first rate of temperature increase to an approach temperature, and a convection heat transfer section for raising the temperature of the article at a second rate of temperature increase from said approach temperature to a predetermined target temperature. The first rate of temperature increase is preferably at least about 2 times, and even more preferably from about 2 times to about 16 times greater than the second rate of temperature increase.

The preferred method aspects of the present invention provide methods for processing a plastisol-containing article in the manufacture of a plastisol-based floor covering comprising the steps of (1) heating the article with substantially only radiant heat transfer to raise the temperature of the article at a rate of at least about 15° F./second to an approach temperature, followed by (2) heating the article with substantially only convective heat transfer to about the predetermined target temperature of said article at a rate at least about two times less than the rate in said radiant heating step.

DETAILED DESCRIPTION OF PREFERRED EMBODIMENTS

Figure 1:
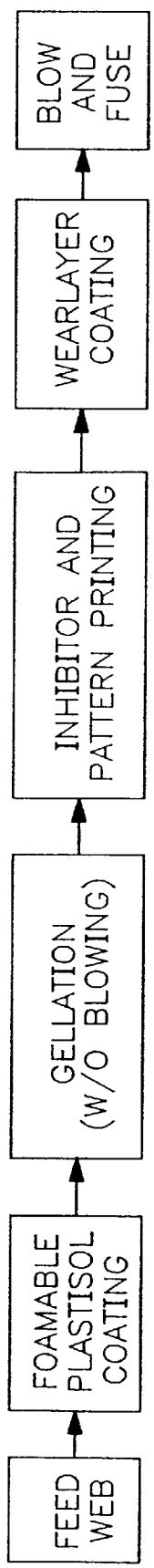
FIG. 1 is a flowchart illustrating a conventional production process for the manufacture of chemically embossed resilient flooring.

The present invention provides apparatus and methods for the efficient and economical transfer of thermal energy into an article which requires an elevated temperature for the purpose of processing. An important and critical aspect of the present invention resides in applicants' discovery that extraordinary benefits can be achieved by isolating radiant heat transfer phenomena from convective heat transfer phenomena and sequencing the heat transfer to provide a first step or stage in which the article is exposed to substantially only radiant heat transfer and a second, subsequent step or stage in which the article is exposed to substantially only convective heat transfer. Applicants have found that isolation and sequencing of the radiant and convective heat transfer phenomena according to the present invention creates substantial and unexpected benefits in the processing of articles, especially and particularly in the processing of articles used in the manufacture of resilient foam flooring.

The methods and apparatus of the present invention are particularly well adapted for processes which require raising the temperature of an article to a predetermined target temperature in a relatively short period of time but which have substantial and significant negative consequences in the event the temperature of the article is raised above the predetermined target temperature. Such a condition exists, for example, in the manufacture of chemically embossed foamed flooring, as described hereinbefore. It will be appreciated by those skilled in the art that these types of preferences and negative consequences are also applicable to the processing of other articles and that the present invention may be utilized to advantage in such other processes.

According to a preferred aspect of the present invention, a heat transfer method for raising the temperature of an article is provided which comprises utilizing substantially only radiant heat transfer to rapidly raise the temperature of the article to an approach temperature which is less than the predetermined target temperature, followed by cessation of substantially all radiant heat transfer and initiation of convective heat transfer to raise the temperature of the article past the approach temperature and to substantially about the predetermined target temperature. Applicants have found that the isolation and sequencing of heat transfer in this fashion permits processing of such an article at speeds and efficiencies that were heretofore unattainable. Other advantages of the present invention are described herein and will become apparent to those skilled in the art. For example, utilization of radiant heat transfer prior to convection heat transfer minimizes undesirable contaminants such as condensed or carbonized plasticizer from contaminating the product and results in substantially "cleaner" product.

As used herein, the term "predetermined target temperature" refers to the temperature to which an article must be raised in order to achieve the goals of the process in question and above which significant detrimental impact on the article and/or process will occur. As will be appreciated by those skilled in the art, the predetermined target temperature applicable for any particular article and/or process may vary greatly depending upon the characteristics of the article, the goals of the process, contemplated subsequent processing and the like. Nevertheless, it is believed that numerous types of processing mechanisms utilize a predetermined target temperature as described herein, and that all such processes may be improved in accordance with the teachings of the present invention.

As used herein, the term "approach temperature" refers to a temperature which is less than the predetermined target temperature by an amount sufficient to establish an acceptable safety buffer or approach range to the predetermined target temperature. Once again, the particular approach temperature which may be associated with any particular article and/or process will vary depending upon the characteristics of the article, goals of the process, and similar considerations. It is contemplated, however, that those skilled in the art, in view of the disclosures and teachings contained herein, can readily determine the appropriate approach temperature for any given article/process.

Although the present apparatus and processes may be utilized in connection with a batch or semi-continuous heating operation, it is generally preferred to implement the present invention in the form of a continuous operation. In general, continuous operations are preferred in connection with flooring manufacture for reasons of production efficiency.

An important aspect of preferred embodiments of the present invention resides in the utilization of a radiant heat transfer step in which both the amount and rate of heat transfer in the radiant zone is substantially greater than in the convection zone. For many articles, the rate of temperature rise of the article is substantially proportional to the rate of heat transfer to the article. For such articles, therefore, the relative rates of temperature rise and the relative temperature change of the article in the radiant versus convection zones is representative of the relative rates of heat flux and heat input, respectively. While products which undergo exothermic or endothermic reactions during processing may be processed using the thermal processing unit of the present invention, it is anticipated that most products processed using the preferred thermal processing unit do not undergo substantial exothermic or endothermic reactions and the temperature history of an article in the thermal processing unit is fairly representative of the heat transfer history of the article. Accordingly, the terms which relate to temperature of articles in the present application refer to the temperature of the article in the absence of exothermic or endothermic reactions. Thus, the present invention may be utilized in connection with the processing of an article so as to achieve an amount and rate of heat transfer in the radiant zone which is substantially greater than in the convection zone.

In the preferred systems of the present invention, the rate of radiant temperature rise of the article being processed is at least two times, and even more preferably at least five times, greater than the rate of temperature rise of the article in the convection section. More rapid rates of temperature rise in convection sections are possible but such rates are undesirable in the present systems because of problems due to the impinging air causing disturbances in the wet surface of the product. It should be understood that, when the temperature rate in a given section of the thermal processing unit is referred to, the term "rate" means the average rate in that section of the thermal processing unit. Furthermore, it is also generally preferred that the temperature change of the article in the radiant section of the present process is at least about two times, and even more preferably at least about five times, greater than the temperature change in the convection section. As the term is used herein, "temperature change" refers to the difference between the temperature of the article upon leaving the thermal transfer zone and the temperature of the article just prior to entering the thermal transfer zone.

Figure 8:
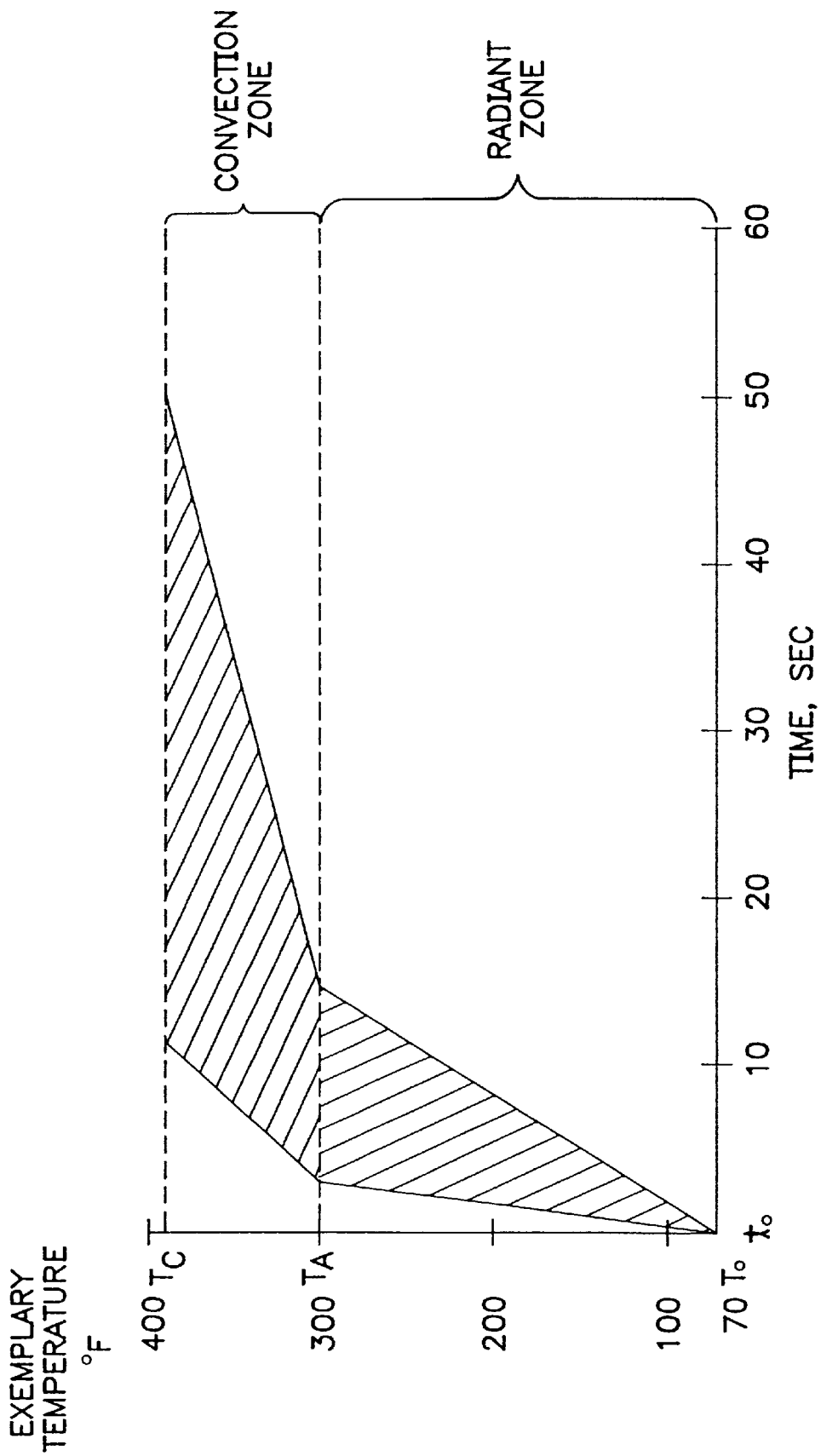
FIG. 8 is a graph illustrating preferred temperature increase rates for an article processed in accordance with the present invention.

With particular reference now to FIG. 8, the temperature profile of a foamable plastisol surface covering article processed in accordance with one preferred embodiment of the present invention is illustrated in graphical form. In this illustration, the radiant section of the thermal processing unit is designated on the graph as the region between the horizontal lines passing through points $T_o$ and $T_A$, respectively. The convection section is represented by the region between the horizontal lines passing through points $T_A$ and $T_c$, respectively. Upon entering the radiant section at time to, the article is at a temperature $T_o$ and rises to a temperature $T_A$. For the purposes of illustration, $T_o$ has been set at 70° F. in FIG. 8. The abscissa has been labeled to illustrate exemplary temperature ranges for the radiant and convection section of the oven. The cross-hatched areas in FIG. 8 represent the preferred range of temperature increase (heat flux) in accordance with the thermal processing units of the present invention. More specifically, the rate of temperature increase in the radiant zone is preferably from about 15 to about 70° F./second, and even more preferably from about 20 to about 60° F./second. Once inside the radiant section, the temperature preferably is raised about 180° F. to about 230° F. to a final temperature of about 250° F. to about 300° F. The radiant heat section 10 very rapidly brings the temperature of the plastisol-based floor covering 16 to an approach temperature, which is preferably within about 20–125° F. of the predetermined target temperature.

On the other hand, the rate of temperature increase in the convection zone is preferably limited to no greater than about 10° F./second, and even more preferably from about 2.5° F./second to about 10° F./second. Furthermore, because most of the necessary heat input has already occurred in the radiant heat section, the temperature of the heating gases in the convection heating section can be set relatively low, for example to from about 3.5° F. to about 100° F., and even more preferably from about 20° F. to about 85° F. above the predetermined target temperature. These limits arise, at least in part, because increasing the impingement velocity of air in the convection section will disturb the surface of the product until it reaches the gellation point.

Not only is the rate of temperature increase in the radiant section substantially greater than the rate of temperature increase in the subsequent convection section, the temperature change in the radiant section is also preferably substantially greater than the temperature change in the convection section.

For the production of embossed resilient flooring, it is contemplated that the present invention can be used to advantage in gellation, in fusion, or in both gellation and fusion. Those skilled in the art will appreciate that the approach temperature and the predetermined target temperature that apply to gellation and/or fusion will depend upon numerous factors, including the particular foamable plastisol which is being used, the thickness of the plastisol layer, the type and amount of blowing agent contained in the plastisol and like factors. Thus, it is contemplated that numerous values for the predetermined target temperature and the approach temperature will be utilized in accordance with the present invention.

In general, however, predetermined target temperatures for both gellation and for fusion will preferably range from about 250° F. to about 390° F. and even more preferably from about 310° F. to about 370° F.

Similarly, the approach temperature that will be utilized may also vary based upon similar factors to those described above, and all such approach temperatures are within the scope of the present invention. In general, however, it is contemplated that the approach temperature for both gellation and for fusion of a foamable plastisol for use in a flooring product will be from about 20° F. to about 125° F. less than the predetermined target temperature, and even more preferably from about 65° F. to about 125° F. less than the predetermined target temperature.

For embodiments involving the gellation or fusion of foamable plastisols, it is also generally preferred that the average rate of temperature increase of the article in the radiant section is from about 15° F. per second to about 70° F. per second, while the rate of temperature rise of a wet coated article in the convection section is preferably no greater than about 10° F. per second.

Despite combining both radiant and convection heating sections, the thermal processing units of the present invention can be less than one-half the length of conventional ovens which utilize convection heating alone. The compact size of the thermal processing units of the present invention is advantageous in that the thermal processing units are easier to clean and, because of their shorter length relative to conventional ovens, produce less scrap product if there is a problem in a given processing run, since a shorter length of product is actually within the thermal processing unit. The shorter length of the thermal processing units also results in less frequent breakage of the backing material or "web" used as the base layer of the flooring product. This lower breakage rate is a result of the lowered tensions in the web due to the shorter length of the thermal processing units.

FIG. 1 represents schematically how a thermal processing unit of the present invention is preferably integrated into a plastisol-based floor covering manufacturing process. Most plastisol-based floor coverings are manufactured by applying a coating or series of coatings onto a base material or "web" such as compressed felt. Accordingly, the first step in such a preferred manufacturing process is to feed the web into a coating device which applies a desired coating, preferably a foamable plastisol coating, onto the web. The plastisol is then gelled for further processing and/or storage.

Although it is contemplated that numerous types of coatings may be used to advantage in the present systems and methods, the preferred coatings are fluid polyvinyl chloride (PVC) plastisol compositions. Fluid PVC plastisol compositions, referred to as "plastisols" hereinafter, comprise liquid plasticizer and a dispersion or suspension of PVC resin in the plasticizer. In especially preferred embodiments, the fluid polyvinyl chloride plastisol composition includes a blowing agent. Blowing agent, as the term is used herein, refers to compounds well known in the art for their ability to decompose at elevated temperatures to yield a gas. Examples of possible blowing agents which may be used in the foamable plastisols processed by the presently claimed apparatus and processes include, but are not limited to, the blowing agents disclosed in U.S. Pat. No. 3,293,094 to R. Frank Nairn et al. For the sake of convenience, the plastisol compositions which include blowing agents are sometimes referred to hereinafter as "foamable plastisols". The thermal processing units of the present invention are used at this gellation step to gel the plastisol without prematurely blowing the blowing agent.

Following gellation, the flooring product is conveyed to an apparatus for inhibitor and pattern printing. After printing, a wear layer coating is applied to the printed, gelled plastisol surface. The wear layer serves as the top layer of the flooring product and protects the patterns beneath. Following application of the wear layer, the flooring material is blown and fused. In preferred embodiments of the present invention, this step is also performed in a thermal processing unit.

The temperature at which a blowing agent present in a foamable plastisol is activated in the thermal processing unit during the blowing step will depend on numerous factors, including the type and amount of the blowing agent used and the properties of the accelerant, if present. However, it is generally contemplated that the foamable plastisols used in the practice of the invention will contain blowing agents which are activated at a temperature of about 300° F. to about 350° F.

Although the thermal processing units of the present invention may be used in a variety of different manufacturing processes, it is believed that the thermal processing units will have their most common use in the production of flooring material and will be used to replace conventional convection ovens used in the gellation and/or fusion steps of flooring product production. Accordingly, preferred embodiments of the thermal processing units useful in gellation and fusion respectively are presented hereinbelow.

Gellation Embodiments

As is well known to those skilled in the art, the traditional, non-reactive fluid plastisol compositions must be processed to develop the desirable wear resistant properties required for resilient flooring. The application of heat to non-reactive fluid plastisols generally causes physical changes in the rheology of the plastisol. That is, the fluid plastisol composition passes through or enters a gel phase as the temperature of the plastisol is raised to a sufficiently high level. Gellation is initiated by introducing the coated web into the radiant heat transfer section of the thermal processing unit. As discussed in further detail hereinbelow, this section of the thermal processing unit is used to rapidly heat the plastisol-based floor covering to an approach temperature close to a predetermined target temperature.

In preferred embodiments of the invention, this predetermined target temperature is above the gellation temperature or gel point of the plastisol but below the temperature at which the blowing agent is activated. When gelling a foamable plastisol, the target temperature of the plastisol should not be exceeded since temperature excursions beyond the target temperature may trigger the activation of blowing agents present in the foamable plastisol. If such activation occurs during the gellation process, the flooring product must be scrapped. For this reason, thermal processing units used to gel a foamable plastisol must be carefully regulated since even short duration temperature excursions can ruin the flooring product being processed.

Techniques are well known and available to those skilled in the art for determining the gel point of any particular plastisol. For example, the gel point may be measured using a gellation plate which is heated only at one end, thereby developing a temperature gradient from one end of the plate to the other. When a fluid plastisol composition is cast onto the plate, the temperature of the plate at the point the plastisol loses its fluidity and develops elastic properties is frequently referred to as the plastisol's gellation temperature or gel point. After complete gellation, the plastisol is generally a substantially dry, relatively firm solid.

The gellation temperature range of any particular plastisol is a function of many variables, including the type and relative amounts of plasticizer resin present. It is generally contemplated, however, that the gellation temperature range for the fluid plastisols suitable for processing using the claimed apparatus and processes will range from about 250° F. to about 350° F., and preferably from about 310° F. to about 320° F.

It is contemplated that the predetermined target temperature for the gellation step of a foamable plastisol in accordance with the present invention will range from about 250° F. to about 350° F., and even more preferably from about 310° F. to about 320° F. The approach temperature utilized in the gellation step will be from about 20° F. to about 100° F. less than the predetermined target temperature, and even more preferably from about 20° F. to about 60° F. less than the predetermined target temperature.

Figure 2:
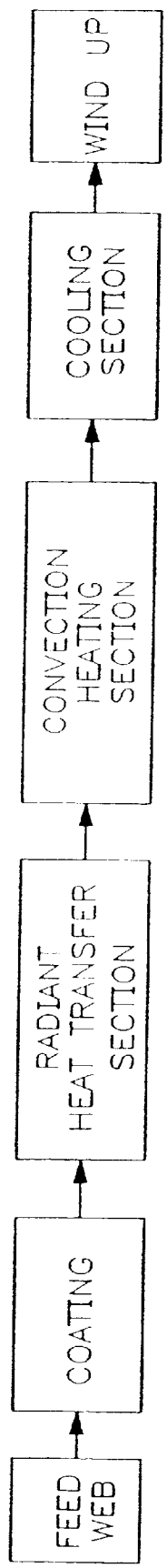
FIG. 2 is a flowchart illustrating a gellation sequence for the manufacture of a plastisol-based floor covering which incorporates a thermal processing unit in accordance with the present invention.

Referring now to FIG. 2, which illustrates the steps in a preferred gellation process, once the gel coating is applied, the flooring product is introduced to the radiant heat transfer section of a thermal processing unit of the present invention. Once the floor covering has been heated to the approach temperature in the radiant heat transfer section, it is conveyed into the convection heating section of the thermal processing unit where the temperature is raised to the predetermined target temperature and gellation of the plastisol is completed.

Upon leaving the convection section of the thermal processing unit, the floor covering preferably enters a cooling section wherein fumes from the heating process are removed and cooling means, such as cooling cans, are used to cool the floor covering so that it may be wound up into rolls for further processing and/or prepared for delivery.

In foamable flooring embodiments, it is also generally preferred that the temperature change in the radiant section is at least about 150° F., more preferable from about 200° F. to about 230° F., and even more preferable from about 225° F. to about 230° F. On the other hand, the temperature change in the convection section is generally limited to the value of the safety buffer utilized, and is thus preferably no greater than about 100° F., and even more preferably from about 20° F. to about 60° F.

The rate of temperature increase in the radiant section of the thermal processing unit is preferably from about 30 to about 60° F./second. In an especially preferred embodiment, the rate of temperature increase in this section of the thermal processing unit is from about 50 to about 60° F./second.

In the practice of the invention, a plastisol-based floor covering enters the radiant section 10 at a temperature of approximately 70° F. Once inside the radiant section, the temperature preferably is raised about 200° F. to about 230° F. to a final temperature of about 270° F. to about 300° F. The radiant heat section 10 very rapidly brings the temperature of the plastisol-based floor covering 16 to an approach temperature, which is preferably within about 20° F. to about 60° F. of the predetermined target temperature.

The temperature of the heating gases in the convection heating section can be set relatively low, for example to from about 5° F. to about 100° F. above the predetermined target temperature, and even more preferably from about 20° F. to about 60° F. above the predetermined target temperature.

For many plastisol gellation embodiments, the maximum product temperature will be about 315° F. to about 325° F., that is, the temperature above which the blowing agent blows. If he predetermined target temperature for a particular gellation process is a about 315° F. and the initiation of blowing will occur at 325° F., the temperature of the heating gas can be set at 320° F. This will guarantee that, even in the case of an extreme disruption to the process, the blowing temperature of the plastisol will not be exceeded as a result of overheating in the convection section.

Figure 7A:
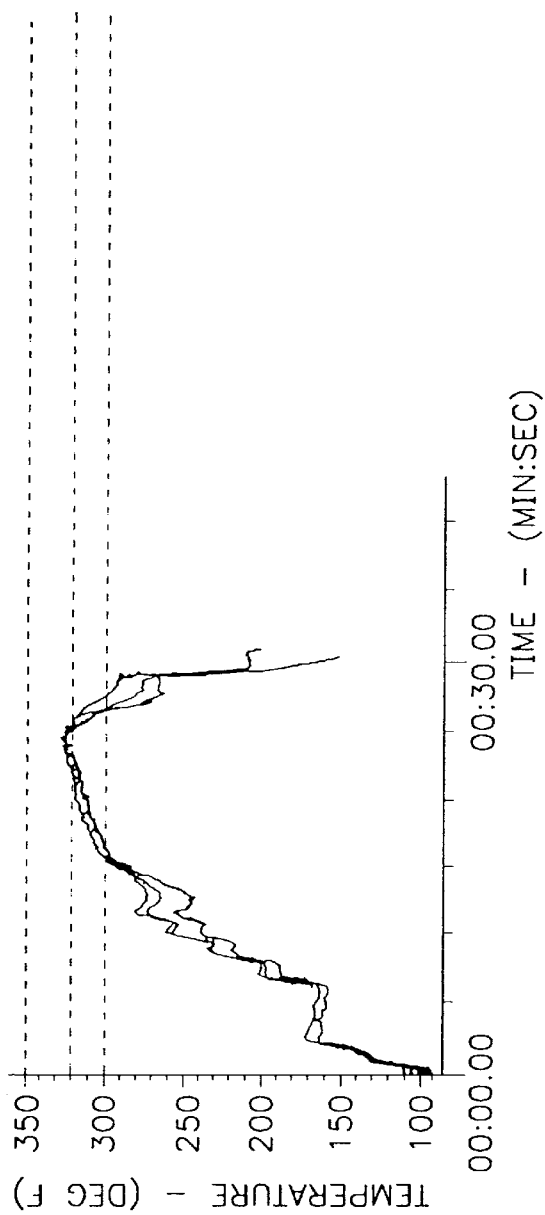
FIG. 7a is a graph illustrating the temperature of a gel coated web as it moves through the thermal processing unit of the present invention.

The advantages of using the presently claimed thermal processing unit are illustrated in FIG. 7. FIG. 7a illustrates web temperature versus time as the web is conveyed through the thermal processing unit of the present invention. A foamable plastisol enters the thermal processing unit at an ambient temperature of approximately 70° F. In the radiant heat transfer section of the thermal processing unit, the temperature of the flooring product is raised to about 280° F. to about 300° F. in approximately 15 seconds. If desired, the radiant heat section is capable of raising the temperature at rates of about 70° F./second. As FIG. 7a illustrates, there are fluctuations in temperature in the radiant heat section of the unit. In particular, fluctuations are visible between T=0 and T=14 seconds. However, these fluctuations are controlled so as to avoid high temperature excursions which might trigger premature blowing of the plastisol. After approximately 15 seconds, the flooring product has achieved an approach temperature of about 275° F., and then enters the convection section of the thermal processing unit. As illustrated in FIG. 7a, the rate of temperature increase in this section is much slower, and the article reaches the predetermined target temperature of approximately 320° F. at about 20 seconds elapsed time and remains at about this temperature until about 25 seconds elapsed time.

Figure 7B:
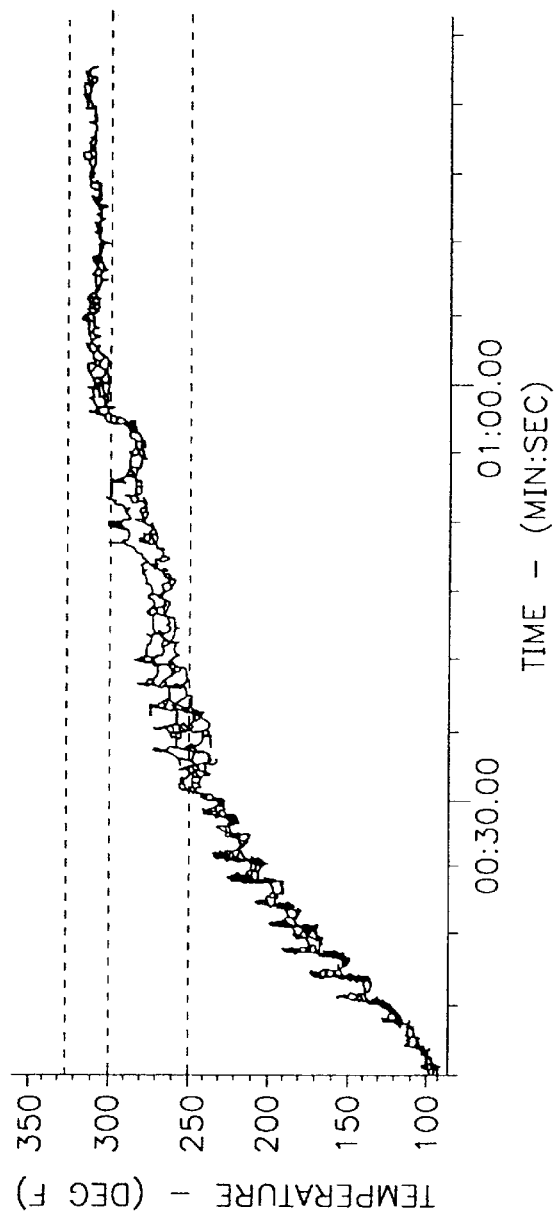
FIG. 7b is a graph illustrating the temperature of a coated web as it moves through a conventional convection oven.

The temperature profile for a conventional convection oven is shown in FIG. 7b wherein the flooring product does not reach the gellation temperature of 320° F. until about 1 minute has elapsed. The rate of increase in temperature in a standard convection oven is approximately 5–10° F./second.

Comparison of FIG. 7a with FIG. 7b illustrates that the thermal processing unit of the present invention is able to complete the gellation process in approximately 25–30 seconds whereas a standard convection oven requires at least one minute to reach the desired gellation temperature.

A preferred embodiment of the present invention relating to the production of embossed resilient flooring is illustrated in FIGS. 3–6 and is described below. Although described herein in connection with gellation, the apparatus illustrated and described is adaptable for use in connection with fusion of plastisol-based surface coverings as well.

Figure 3:
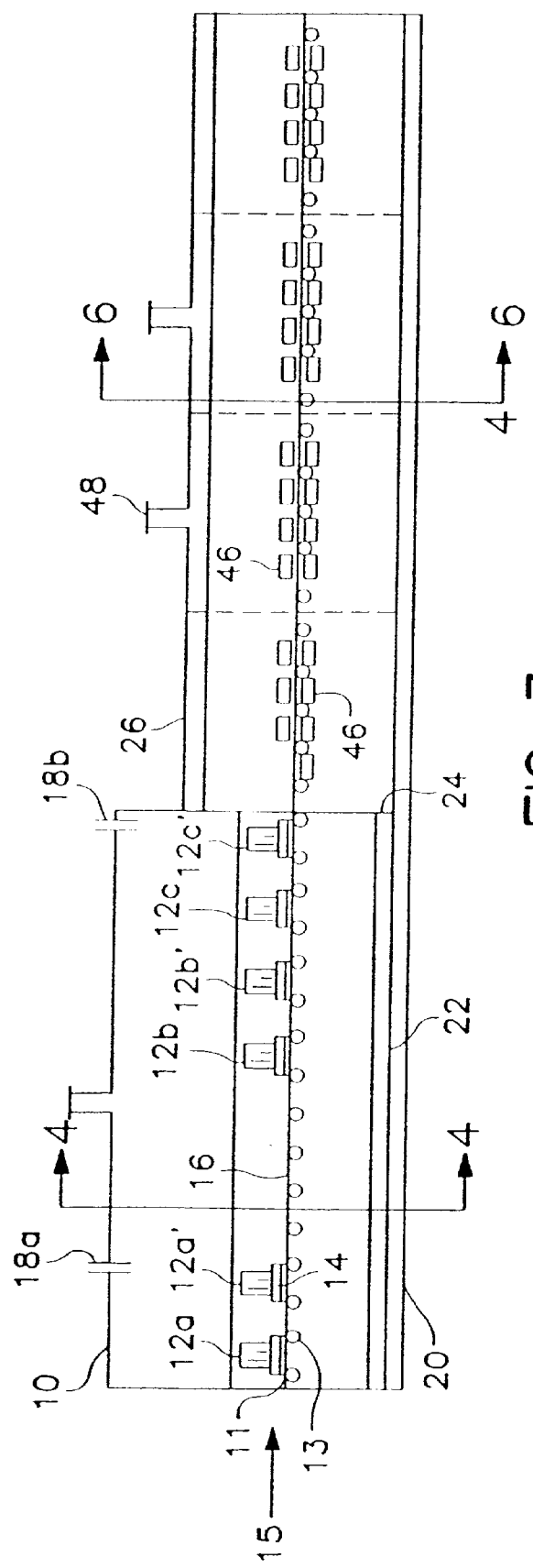
FIG. 3 is a semi-schematic, longitudinal sectional view of a preferred heat transfer unit of the present invention, illustrating the radiant heat section and the convection heating section.

As illustrated in FIG. 3, the thermal processing units of the present invention include two sections: a radiant heat transfer section 10, and a convection heating section 26. In preferred embodiments, the present invention also includes an exhaust hood section positioned after the convection heating section. The exhaust section draws off the fumes generated during the processing steps and cools down the plastisol-based floor covering.

Transporting Means

A variety of means known in the art for transporting a flooring material through processing machinery may be used in the practice of preferred embodiments of the present invention, such as conventional conveyor belts and the like.

Referring now to FIG. 3, a preferred transporting means comprising a beltless conveyor system 11 of a type known in the art for transporting plastisol-based floor covering is illustrated.

A beltless conveyor system, as the term is used herein, refers to a series of idler rollers 13 disposed substantially perpendicular to the direction of travel 15 of the flooring material and substantially parallel to one another. The rollers are positioned at intervals which allow for sufficient support of the floor covering. In preferred embodiments, these intervals are such that rollers are not positioned directly below a given radiant heat source 12 in the radiant heat section of the thermal processing unit 10. Each idler roller 13 has an axle which runs through the center of the long axis of the roller defining the axis of rotation for the roller. The idler rollers may be driven by drive means (not shown) of any conventional configuration known to those skilled in the art.

The speed at which a plastisol-based floor covering material can move through the thermal processing unit is determined primarily by the type of floor covering being manufactured and the heating requirements for that type of floor covering, in particular, the temperature conditions required to cause the plastisol to gel. According to preferred embodiments, the plastisol-based floor covering may be transported through the thermal processing unit of the present invention at substantially increased rates relative to prior art systems, resulting in heating times which may approach one-third the heating time of convection ovens.

Radiant Heat Transfer Section

Referring again to FIG. 3, the first section of the thermal processing unit is a radiant heat transfer section 10. In preferred embodiments, the radiant heat utilized in this section of the thermal processing unit is in the form of infrared radiation. The radiant heat transfer section 10 provides a means for very rapidly increasing the temperature of plastisol-based floor covering 16 without disturbing the surface of the plastisol, as occurs in convection oven systems where the rapid passage of air over the surface of the plastisol can distort the uniformity of the surface layer of the plastisol and deposit contaminants in the plastisol before it gels and dries. In fact, applicants have found that the use of this radiant heat transfer section results in substantially cleaner flooring product since much fewer contaminants are deposited on the wet coating in the radiant section of the thermal processing unit and since the coating is sufficiently dry by the time it enters the convection section of the thermal processing unit. The rate of temperature increase in this section of the thermal processing unit is preferably about 30–60° F./second. In an especially preferred embodiment, the rate of temperature increase in this section of the thermal processing unit is about 50–60° F./second. In the practice of the invention, a plastisol-based floor covering enters the radiant section 10 at a temperature of approximately 70° F. Once inside the radiant section, the temperature preferably is raised about 200° F. to about 230° F. to a final temperature of about 270° F. to about 300° F. The radiant heat section 10 very rapidly brings the temperature of the plastisol-based floor covering 16 to an approach temperature, which is preferably within about 20–60° F. of the predetermined target temperature. Accordingly, the radiant heat section of the thermal processing unit rapidly imparts to a plastisol-based floor covering enough heat energy that the temperature of the floor covering is rapidly brought to within a buffer or safety zone of the target temperature.

In a preferred embodiment of the invention, the radiant heat sources 12 are positioned in the thermal processing unit such that the face 14 of a radiant heat source 12 is in close proximity to the plastisol-based floor covering which passes beneath on the conveyor system. In preferred embodiments, this distance is about 5 to about 9 inches above the plastisol-based floor covering 16. In the most preferred embodiment, this distance is about seven inches. The number and positioning of the radiant heat sources may vary according to the nature of the product being processed by the thermal processing unit and the number and positioning of the radiant heat units in FIG. 3 should be understood to represent only a preferred embodiment of the present invention. In the embodiment illustrated in FIG. 3, the radiant heat sources are preferably grouped into three pairs 12a, 12b and 12c. In this embodiment, the individual radiant heat sources in a given pair are separated by about 46 inches from the center of one radiant heater to the center of the next heater in the pair. This separation is designed to allow the heat from the first radiant heater to penetrate the plastisol coating before the floor covering encounters the second radiant heater in a given pair. Other arrangements are possible depending on the needs of the user and the physical properties of the product being processed.

To avoid exceeding the desired temperature maximums in the radiant heat section of the thermal processing unit, one or more temperature sensors 18 are used to monitor the surface temperature of flooring product in the radiant heat section 10. The temperature data from the temperature sensor is sent to a computerized temperature control system which automatically modulates the radiant heat sources 12 by variation of the gas flow to the preferred radiant heat sources. Modulate, as the term is used herein, refers to the ability of the temperature control system to increase or decrease the heat output of the radiant heat sources and includes the ability to completely and rapidly terminate heat flow from a radiant heat source to avoid near approaches to unacceptably high temperature excursions. Using such preferred sensors and temperature control systems, applicants have discovered that the average temperature of the article in the radiant heat section can be controlled to within about ±5° F. In preferred embodiments, the temperature sensors do not require direct contact with the floor covering and instead are capable of measuring the amount of infrared radiation emitted from the surface of the floor covering. These temperature sensors measure the amount of infrared radiation present at the surface of the floor covering and convert this information into temperature data. Because different floor coverings will emit different amounts of infrared radiation depending on properties such as the color, consistency and chemical properties of the surface coating of the floor covering, the temperature sensors are preferably capable of being calibrated for different types of floor coverings. In preferred embodiments, the temperature sensors utilize a laser beam to aim the temperature sensors at a specific region of the plastisol-based floor covering 16 as it passes beneath on the conveyor system 11. Examples of temperature sensors acceptable for use in the practice of the present invention include temperature sensors manufactured by Raytech® or Omega Engineering. If desired, the sensors are isolated with appropriate insulation and purging systems to withstand the conditions in the radiant section of the thermal processing unit.

The temperature sensors 18 are coupled to the radiant heat sources 12 and are designed to rapidly modulate, and in the event of near approach to an extreme temperature excursion, terminate flow of energy from the radiant heat sources 12 if the temperature exceeds a given set point. In an embodiment of the invention illustrated in FIG. 3, the radiant heat transfer section of the thermal processing unit is divided into two subsections: a first subsection 20 which includes a temperature sensor 18a and a second subsection 22 which includes a temperature sensor 18b positioned close to the junction 24 between the radiant 10 and convection 26 heat sections of the thermal processing unit. The temperature sensors 18a and b monitor temperature and automatically modulate the radiant heat sources if the temperature of the plastisol-based floor covering is not equal to a preset temperature. In the practice of the present invention, this preset temperature will be at a desired approach temperature.

In the preferred embodiment illustrated in FIG. 3, the radiant heat sources 12 are controlled in pairs 12a–12a', 12b–12b' and 12c–12c' and the radiant heat sources in each pair are regulated according to the temperature data obtained by the sensor that is in the same subsection of the radiant heat transfer section as the radiant heat source. In addition to automatic control by the temperature sensors, the radiant heat sources may be turned off manually if desired.

By combining temperature sensors with radiant heat sources which can be rapidly shut down and which have an inherent ability to cool to ambient temperature within seconds, the thermal processing unit of the present invention provides an exceptionally effective means for avoiding high temperature excursions which can destroy foamable plastisol-based floor coverings due to premature blowing. The control achieved by use of the temperature sensors coupled to radiant heat sources capable of rapid cooling dramatically reduces the amount of flooring product which must be scrapped due to high temperature excursions, as compared to the prior art.

Figure 4:
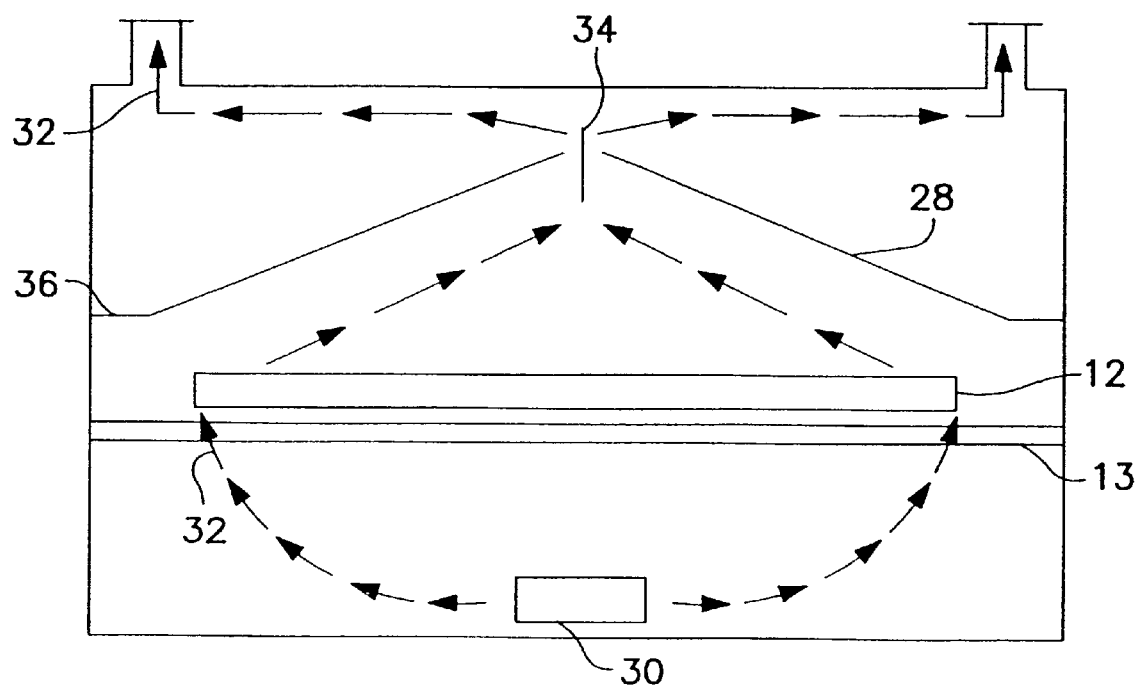
FIG. 4 is a semi-schematic cross-sectional view taken through the radiant heating section along the 4—4 in FIG. 3.

FIG. 4 represents a cross-sectional view of the infrared section of the thermal processing unit taken along line 4—4 of FIG. 3. In preferred embodiments of the invention the infrared section of the thermal processing unit has a slanted roof 28. The slanted roof provides a chimney-like effect for eliminating the fumes and natural gas combustion products which accumulate in the infrared section of the thermal processing unit. An air duct 30 introduces air into this section of the thermal processing unit. The air helps to eliminate fumes generated by the heating of the plastisol as well as natural gas combustion products in this section of the thermal processing unit. The air, once it has entered the section, follows approximately flow path 32, along the slanted roof 28 and exits at the apex 34 of the slanted roof where it is drawn off for incineration or other appropriate treatment. Accordingly, the ventilation in the infrared section of the thermal processing unit prevents a possible explosion in this part of the unit due to accumulation of pockets of natural gas and eliminates the fumes generated in this section of the unit. The slanted roof 28 provides an additional advantage in that plastisol and/or plasticizer residue which condenses or otherwise accumulates on the slanted roof 28 during processing will not fall directly onto the floor covering passing underneath, but will tend to run along the surface of the slanted roof to the outer edges 36 of the slanted roof where it falls onto an area outside of the edge of the floor covering passing through the thermal processing unit. This avoids undesirable contamination during the production of a floor covering with residue from previous processing runs. FIG. 3 additionally illustrates how the radiant heat sources 12 are in close proximity to the floor covering as it is conveyed over the rollers 13 of the conveyor system. Although not illustrated in FIG. 3, all the necessary gas lines and mounting hardware are mounted above the radiant heat sources so as to further avoid sites for deposition of residue that could later fall onto a floor covering passing through the thermal processing unit.

Figure 5:
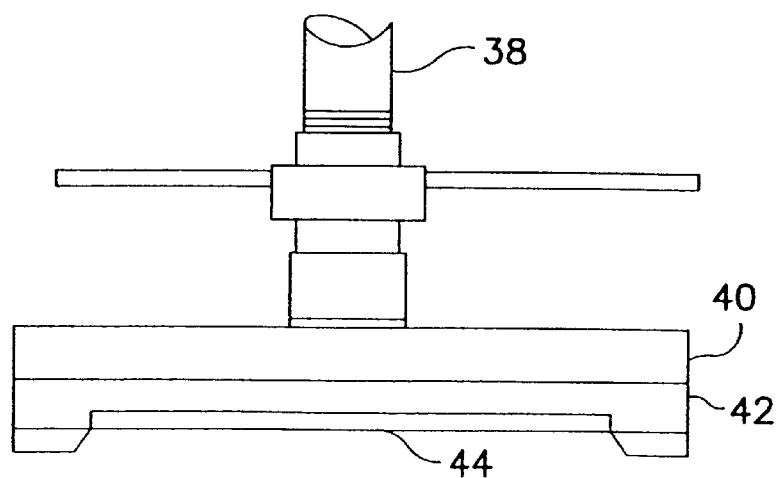
FIG. 5 is a semi-schematic cross-sectional view of one of the radiant heaters used in the radiant heat section.

A variety of commercially available radiant heat sources may be utilized in the radiant heat section 10 of the thermal processing unit. However, in preferred embodiments, a radiant heat source capable of cooling to room temperature within one second of being shut off is desired. In especially preferred embodiments, the radiant heat sources 12 utilize materials having a high surface area to mass ratio and which are capable of emitting infrared radiation. Materials such as foamed ceramic materials are especially preferred in the practice of the invention. An example of such a radiant heat source is illustrated in FIG. 5, which illustrates a cross-sectional view through a preferred design for the radiant heater units 12 in illustrated FIG. 3. Natural gas and air are pumped through a gas feeder line 38, into a gas/air feeding plenum 40 and into a foamed ceramic matrix 42 which emits infrared radiation when heated. Combustion of the natural gas occurs within but close to the surface 44 of the foamed ceramic matrix 42. The foamed ceramic matrix is heated by the combustion of the natural gas causing the matrix to emit infrared (IR) radiation towards the flooring product passing underneath. Because of the high surface area to mass ratios of the emitter, emitters such as the foamed ceramic type can cool at a very quick rate when combustion is halted. Although foamed ceramic emitters are preferred in the practice of the invention for their ability to rapidly cool, other types of emitters are acceptable in the practice of the invention. Examples of commercially available radiant heaters which may be used in the practice of the invention include foamed ceramic-type radiant heaters available from Marsden Inc. of Pennsauken, New Jersey and identified as Marsden Gas IR Systems, and electrically heated radiant heat sources available from Glenro Inc.

Convection Heating Section

Referring again to FIG. 3, once the plastisol-based floor covering is brought close to the predetermined target temperature, that is, the approach temperature in the radiant heat section 10 it is transported into the convection section 26. Relative to the radiant heat section of the thermal processing unit, the convection heating section of the oven provides slower, more controlled heat transfer. Because most of the necessary heat input has already occurred in the radiant heat section, the temperature of the heating gases in the convection heating section can be set relatively low, for example to from about 5° F. to about 100° F., and even more preferably from about 20° F. to about 60° F. above the predetermined target temperature. This provides for uniform heating of the floor covering and also provides significant additional advantages.

The use of relatively low temperature heating gas can be used in accordance with the present invention to virtually ensure that the predetermined target temperature is not exceeded by a detrimental amount. When this is combined with the use of a preceding radiant section with radiant heat source that cool rapidly in accordance with the preferred aspects of the present invention, extraordinary flexibility in operating speeds can be achieved. For example, the rate at which the floor covering passes through the thermal processing unit can be reduced dramatically, even as low as essentially zero, without damage to the product being produced. On the other hand, very high processing speeds can be achieved because of the high rate of heat input available from the radiant section of the present invention. These highly desirable results flow directly from the features of the invention described herein.

According to preferred embodiments, plastisol-based floor covering may be processed in the same apparatus at rates as low as about 30 ft./min to as high as about as 200 ft./min. However, in preferred embodiments and under normal operation, the plastisol-based floor covering is processed at rates of from about 140 to about 180 ft./min. During periods when it might be desirable to slow down production of plastisol-based floor covering or during the processing of a floor covering having properties which require slower processing, the floor covering may be processed at rates as low as about 80–100 ft./min.

The circulating air in the convection section is able to remove the heavy fumes produced in this section. In preferred embodiments, this section includes one or more exhaust ducts 48 which draw off the fumes produced during gellation.

In preferred embodiments, the rate of temperature increase in the convection section is about 2.5° F./second and the temperature can be controlled to within about ±1° F.

Figure 6:
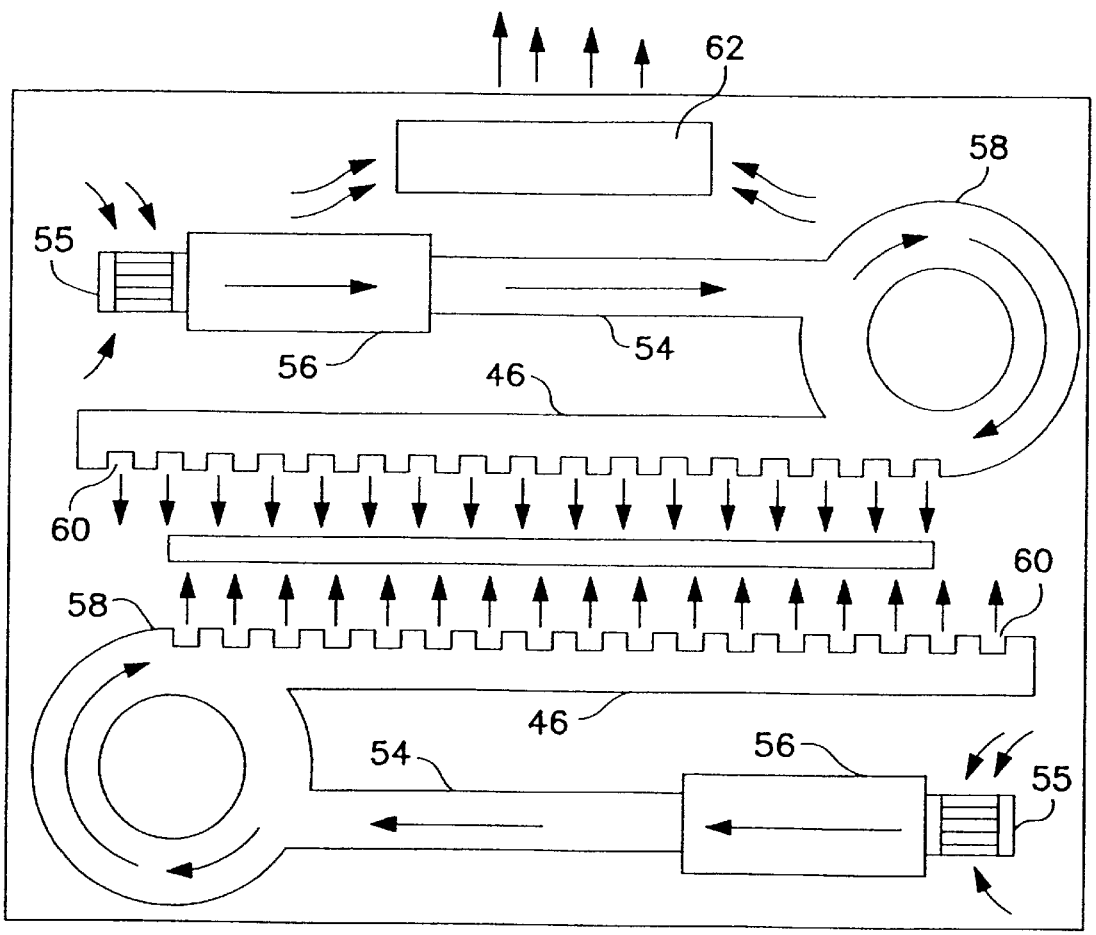
FIG. 6 is a semi-schematic cross-sectional view taken through the convection heating section.

As illustrated in FIG. 3, the convection section of the thermal processing unit 26 contains a series of nozzle boxes 46 disposed above and below the beltless conveyor system. Nozzle box, as the term is used herein, generally refers to conventional hot air distribution systems known in the art. In particular, it relates to a metal duct disposed substantially perpendicular to the direction of travel of the floor covering wherein the duct has openings on the surface in closest proximity to the floor covering. Air is circulated through the duct work and is heated and discharged through the openings onto the surface or base of the floor covering, depending on whether the nozzle box is disposed above or below the conveyor system. Referring now to FIG. 6, a schematic cross-section of the convection section of the unit taken along line 6—6 of FIG. 3 is illustrated. In preferred embodiments, the convection heating section is composed of a plurality of subsections wherein a circulation fan which takes air present in that subsection, draws the air through a filter and into an air duct 54 which carries the air past an ignited gas burner 56. The gas burner heats the passing air which is then sent into a nozzle box 46. The aic is then forced through the openings 60 present on the surface of the nozzle box 46 and onto the flooring product. The expelled air is then recirculated and the process repeated. In especially preferred embodiments of the invention, the convection section of the thermal processing unit is divided into subsections, such as, for example, as shown in FIG. 3, four subsections each having its own air circulation system and, if desired, exhaust system 62.

Although gas burners are used to heat the air in the convection section, other types of heat sources such as electric heat or hot oil sources might be used. However, it is believed that natural gas is the most cost-efficient heating means in this section of the thermal processing unit.

Convection sections of the type used in the thermal processing units of the present invention may be obtained from a variety of sources, including Bruckner Machinery Corporation of Spartanburg, S.C.

In preferred embodiments of the invention, the impingement velocity of the air or gas in the convection heating section is greater than about 3,000 ft./min., more preferably about 4,000 ft./min. and most preferably about 6,000 ft./min.

The Cooling/Exhaust Hood Section

As the plastisol-based floor covering leaves the convection section of the thermal processing unit, it may be transported into a cooling/exhaust hood section which removes fumes evolving from the surface of the floor covering. These fumes are drawn upwards into an exhaust fan and conveyed to a fume incinerator for destruction. The exhaust hood section of the thermal processing unit may additionally include means for cooling down the gelled plastisol. In preferred embodiments the cooling means comprise rollers filled with chilled water known in the art as cooling cans. The cooling cans can rapidly cool the floor covering to less than 90° F. so that the floor covering may be rolled up for transport or conveyed to other processing machinery.

Fusion Embodiments

While the disclosure above describes the application of the thermal processing unit to the gelling operation of manufacturing vinyl floor covering, it should be apparent to one skilled in the art that the present invention is adaptable for use in the fusion operation of flooring manufacture. The thermal processing unit disclosed will provide the same benefits for the fusion process as the gellation process, that is, lack of contamination, improved control and higher efficiency. In particular, undesirable contamination of the wet wear layer coating applied prior to fusion is avoided because the utilization of radiant heat transfer prior to convection heat transfer minimizes undesirable contaminants from contaminating the wear layer.

As those of skill in the art are aware, the objective of the fusion process is to fuse the plastisol while causing controlled foaming of the plastisol layer. However, temperatures above a desired maximum processing temperature will result in overblowing the plastisol layer resulting in substandard product. The thermal processing unit of the present invention avoids this undesirable overblowing problem by closely regulating temperature in the convection section of the thermal processing unit.

It is contemplated that the predetermined target temperature for the fusion step of a foamable plastisol in accordance with the present invention preferably will range from about 320° F. to about 390° F., and even more preferably from about 350° F. to about 370° F. The approach temperature utilized in the fusion step preferably will be from about 20° F. to about 125° F. less than the predetermined target temperature, and even more preferably from about 65° F. to about 125° F. less than the predetermined target temperature.

In embodiments of the thermal processing unit used in fusion, it is also generally preferred that the temperature change in the radiant section is at least about 180° F., more preferable from about 180° F. to about 205° F. On the other hand, the temperature change in the convection section is generally limited to the value of the safety buffer utilized, and is thus preferably no greater than about 140° F., and even more preferably from about 45° F. to about 140° F.

The rate of temperature increase in the radiant section of the thermal processing unit is preferably about 15–60° F./second. In an especially preferred embodiment, the rate of temperature increase in this section of the thermal processing unit is about 20–40° F./second. In the practice of the invention, a plastisol-based floor covering enters the radiant section 10 at a temperature of approximately 70° F. Once inside the radiant section, the temperature preferably is raised about 180° F. to about 205° F. to a final temperature of about 250° F. to about 275° F.

The radiant heat section 10 very rapidly brings the temperature of the plastisol-based floor covering 16 to an approach temperature, which is preferably within about 65–115° F. of the predetermined target temperature.

The temperature of the heating gases in the convection heating section can be set relatively low, for example to from about 3.5° F. to about 85° F., and even more preferably from about 60° F. to about 85° F. above the predetermined target temperature.

Figure 9:
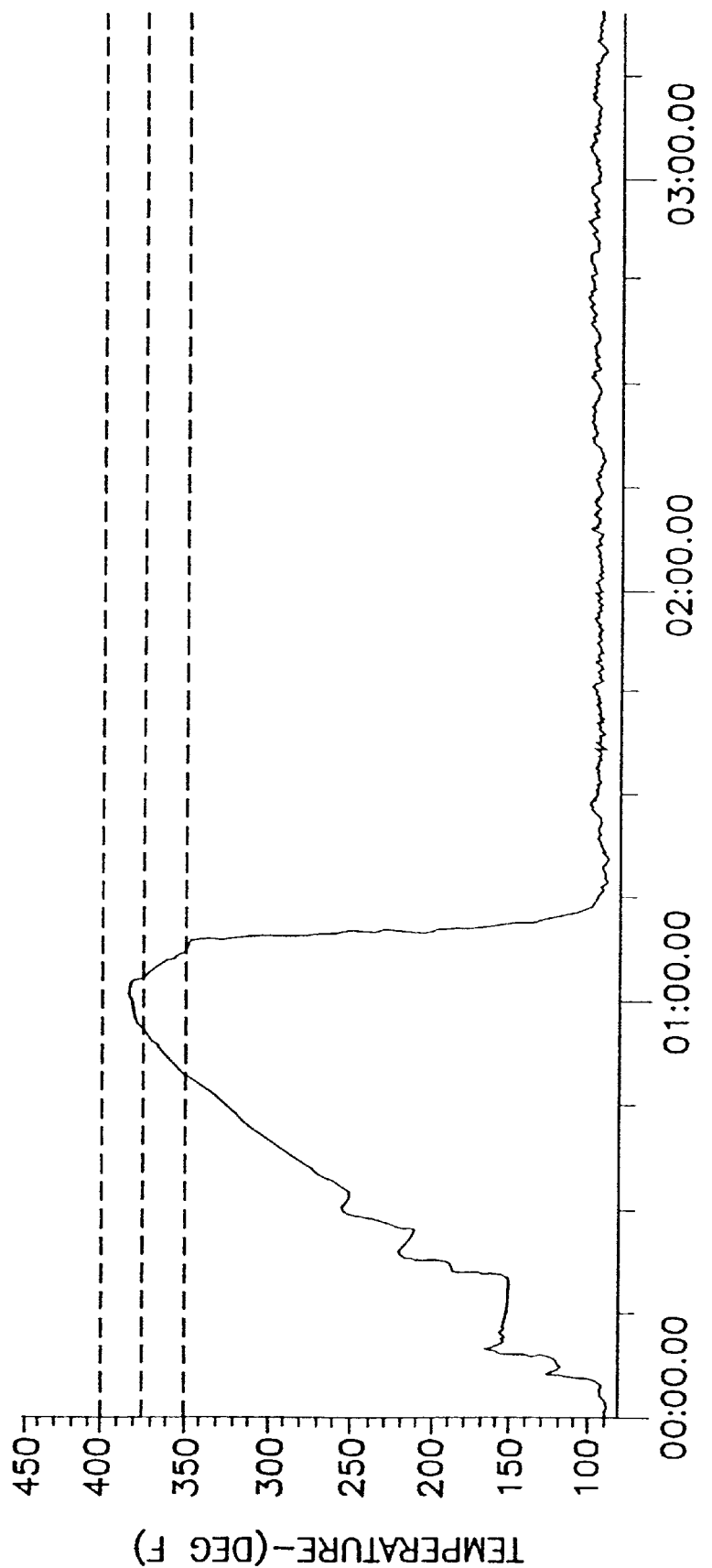
FIG. 9 is a graph illustrating the temperature of a gell coated web as it moves through an embodiment of the thermal processing unit of the present invention utilized for fusion.

The advantages of using the presently claimed thermal processing unit are illustrated in FIG. 9. FIG. 9 illustrates web temperature versus time as the web is conveyed through the thermal processing unit of the present invention. A foamable plastisol enters the thermal processing unit at an ambient temperature of approximately 70° F. In the radiant heat transfer section of the thermal processing unit, the temperature of the flooring product is raised to about 250° F. to about 275° F. in approximately 25 to 30 seconds. If desired, the radiant heat section is capable of raising the temperature at rates of about 70° F./second. As FIG. 9 illustrates, there are fluctuations in temperature in the radiant heat section of the unit. In particular, fluctuations are visible between T=0 and T=30 seconds. However, these fluctuations are controlled so as to avoid high temperature excursions which might trigger premature blowing of the plastisol. After approximately 35 seconds, the flooring product has achieved an approach temperature of about 260° F., and then enters the convection section of the thermal processing unit. As illustrated in FIG. 9, the rate of temperature increase in this section is much slower, and the article reaches the predetermined target temperature of approximately 375 to about 380° F. at about 55 seconds elapsed time and remains at about this temperature until about 62 seconds elapsed time.

Figure 10:
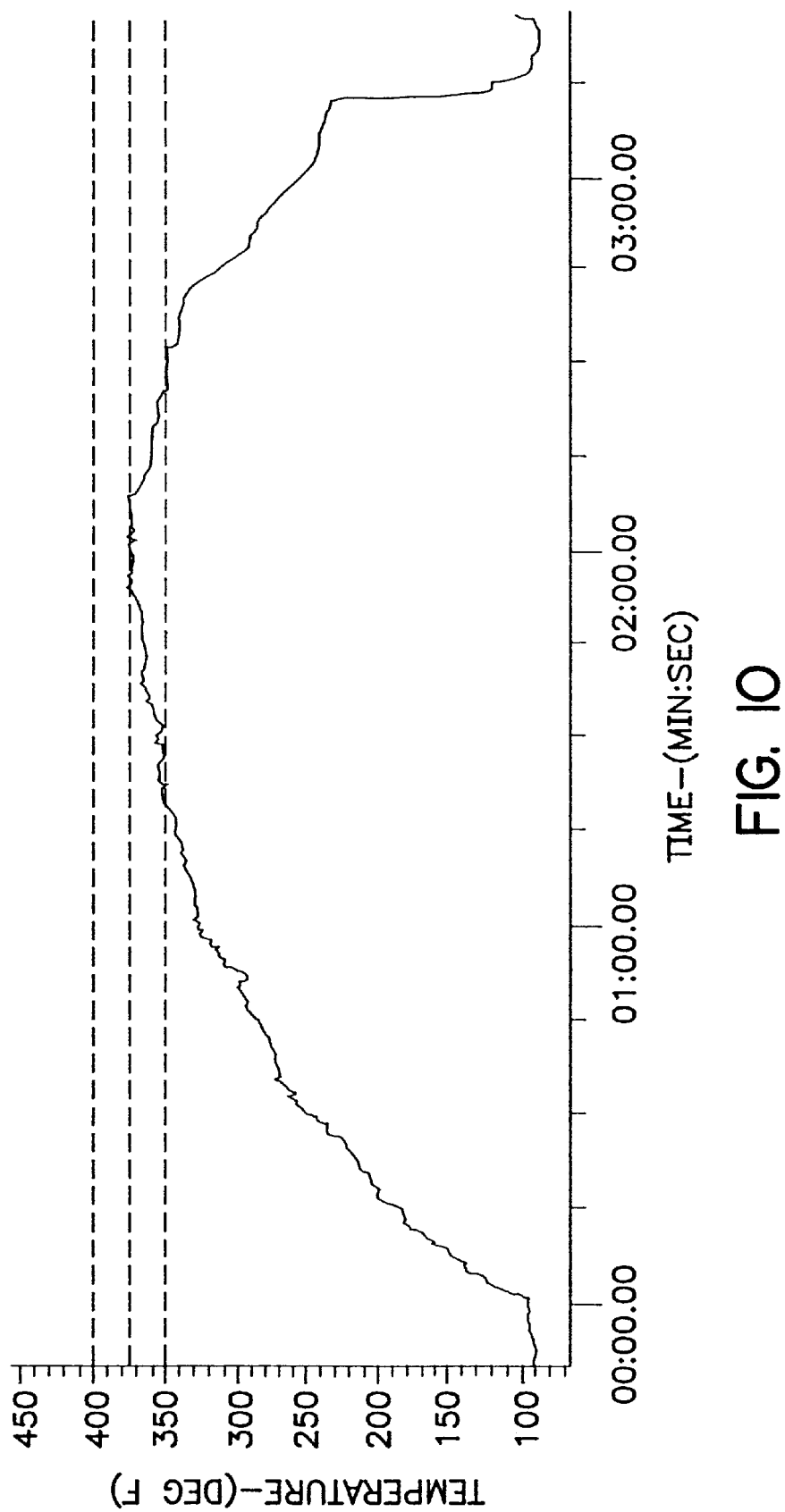
FIG. 10 is a graph illustrating the temperature of a coated web as it moves through a conventional convection oven used for fusion.

The temperature profile for a conventional convection oven is shown in FIG. 10 wherein the flooring product does not reach the fusion temperature of 375° F. until about 2 minutes has elapsed. The rate of increase in temperature in a standard convection oven is approximately 2.5° F./second.

Comparison of FIG. 9 with FIG. 10 illustrates that the thermal processing unit of the present invention is able to complete the fusion process in approximately 50 to 70 seconds whereas a standard convection oven requires at least 2 minutes to reach the desired fusion temperature.

The present invention will be further described with particular reference to the following examples.

EXAMPLES

Example 1

This example shows the preparation of a floor covering comprising a carrier substrate having adhered to one side thereof a plastisol-based resinous layer using the thermal processing unit of the present invention.

To begin the processing of a plastisol-based floor covering, a "lacer" is run through the production line. At this point, the convection sections of the thermal processing unit are started. When the convection sections of the thermal processing unit reach a temperature of about 320° F., a carrier substrate, known in the art as the "web", comprising a felt-like material which serves as the bottom layer of the plastisol-based floor covering is cut into the lacer. The production substrate is then conveyed to a gel coater which applies a plastisol-based gel coating on top of the production substrate. At the gel coater, about 10 mils (0.010") of a foamable plastisol are coated onto a carrier substrate having a thickness of about 25 mils (0.025") according to prior art techniques. The carrier substrate, which is fed from a roll, is about 12'wide and comprises a felt backing.

The foamable plastisol comprises the following.

|  | Amts., lbs. |
|---|---|
| Goodrich Geon 180 × 10 dispersion grade PVC Resin | 500 |
| Borden VC 260ss extender grade PVC | 350 |
| plasticizer (BBP) | 336 |
| alkyl & aryl hydrocarbons | 148 |
| Aromatic hydrocarbon | 40 |
| blowing agent | 59 |
| filler (CaCO$_3$) | 450 |
| Total Weight | 1883 |

The plastisol has a Brookfield viscosity of about 1100 cps @ 70° F.

Upon leaving the gel coater, the floor covering is still wet and before it enters the thermal processing unit the radiant heaters are ignited. When the wet coating enters the radiant heat transfer section, the line speed is increased to the desired production speed of about 150 ft./min, corresponding to a dwell time for the thermal processing unit (radiant and convection sections) of 28 seconds. The infrared heaters are ignited as the floor covering enters the radiant section of the thermal processing unit.

The radiant heat transfer section of the thermal processing unit raises the temperature of the flooring material to about 170° F. in the first subsection and to about 265° F. in the second subsection.

To avoid overheating the floor covering, the temperature sensor in the first subsection is adjusted so that it will modulate the radiant heat sources to maintain the temperature specified above.

The flooring material has a temperature of about 265° F. as it enters the convection section of the thermal processing unit, which is maintained at a temperature of about 320° F., the target temperature for the foamable plastisol present in the coating. As the floor covering is transported through the convection heating section, its temperature is increased and maintained at about 320° F. until gellation of the plastisol is complete. In the convection section the rate of air circulation is 120 cubic feet per minute per square foot of product.

Following transit through the convection section, the flooring material is transported to a section where it is run over a series of cooling cans which lower the temperature of the floor covering to about 90° F. and any residual fumes are removed.

Once the desired length of floor covering is produced, a lacer is cut into the terminal end of the floor covering substrate. When the lacer reaches the gel coater, the coating is stopped and the uncoated substrate is permitted to pass through the thermal processing unit. The radiant heaters are then shut down, and the burners in the convection section are shut down. The lacer continues to run until the convector section cools to less than 300° F.

The 2-ply composite is then wound into a roll and conveyed to a printing station. At the printing station, the roll is unwound and a pattern is printed on the surface of the gelled foamable plastisol by means of a rotogravure press. For this purpose, there is used an embossing composition which includes therein pigment and an inhibitor for deactivating the blowing agent in certain regions of the gelled foamable plastisol. (As described in U.S. Pat. No. 3,292,094, the inhibitor, upon coming into contact with the blowing agent, has the effect of raising the temperature at which the blowing agent "blows") The printed gelled composite is then wound and transported to a fusion line.

A liquid resinous wearlayer composition is applied to the surface of the printed gelled composite in a thickness of about 14 mils by a reverse roll coater. The coating composition comprises a fusible non-foamable fluid plastisol paste.

The wearlayer composition is fed from the bottom of the mixing vessel to the reservoir of a reverse roll coater through a hose. The printed gelled composite having the coating of fluid wearlayer composition is then converted to a solid composition in a fusion oven. Fusion occurs at an elevated temperature to form a wearlayer and to decompose the blowing agent in the gelled base layer and effect foaming thereof if those portions not printed with the embossing composition.

Example 2

This example presents the use of the thermal processing unit in the fusion step of flooring product manufacture. This step would normally follow the gellation process presented in Example 1.

To begin the fusion step in the processing of a plastisol-based floor covering, a "lacer" is run through the production line. At this point the burners in the convection sections of the thermal processing unit are started. When the convection sections of the thermal processing unit reach a temperature of about 450° F., a carrier substrate, known in the art as the "web", is cut into the lacer. The carrier substrate consists of a felt like material with a foamable plasticizer coated on top that has been previously gelled, such as described in Example 1. Also at this stage the substrate has been through a printing process to place the printed pattern on the top layer.

The production substrate is then conveyed to a coater which applies a plastisol-based wearlayer coating on top of the production substrate. At the coater, about 10 mils (0.010") of the plastisol-based wearlayer are applied to the substrate. The substrate has a thickness of about 35 mils (0.035") before the coating is applied. The carrier substrate is fed from a roll that is about 12' wide.

Upon leaving the coater, the floor covering is still wet. Before it enters the thermal processing unit, the radiant heaters are ignited. When the wet coating enters the radiant heat transfer section, the line speed is increased to the desired production speed of about 60 ft/min., corresponding to a dwell time in the thermal processing unit (radiant and convection sections) of about 70 seconds.

The radiant heat transfer section of the thermal processing unit raises the temperature of the flooring material to about 150° F. in the first subsection and to about 250° F. in the second subsection.

To avoid overheating the floor covering, the temperature sensors if the radiant section are used through a control system to modulate the heat output of the radiant heaters to maintain the temperature specified above.

The flooring material has a temperature of about 250° F. as it enters the convection section of the thermal processing unit, which is maintained at a temperature of about 450° F. As the floor covering is transported through the convection heating section, its temperature is increased and maintained at about 375° F. until the proper foaming of the gel layer and curing of the plastisol is complete. In the convection section the rate of air circulation is 120 cubic feet per minute per square foot of product.

Following transit through the convection section, the flooring material is transported to an exhaust hood where it is run over a series of cooling cans which lower the temperature of the floor covering to about 90° F. and any residual fumes are removed.

Once the desired length of floor covering is produced, a lacer is cut into the terminal end of the floor covering substrate. When the lacer reaches the coater, the coating is stopped and the lacer passes through the thermal processing unit. The radiant heaters are then shut down, and the burners in the convection section are shut down. The lacer continues to run until the convection section cools to less than 300° F.

The 3-ply composite is then wound onto a roll as a finished product. The finished roll product is then taken to a warehouse for final inspection, cutting, and packaging.

What is claimed is:

1. A thermal processing unit for processing a foamable plastisol used in the manufacture of a floor covering comprising:
   a radiant heat transfer section for raising the temperature of the foamable plastisol at a rate of from about 20° F. per second to about 70° F. per second, said section comprising radiant heat sources capable of rapidly cooling from a desired operating temperature to room temperature;
   a separate convection heat transfer section following said radiant heat transfer section for raising the temperature of said plastisol at a rate of from about 2.5° F. per second to about 10° F. per second; and
   conveyor means which transport said foamable plastisol from said radiant transfer section to said convection heat transfer section.

2. The thermal processing unit of claim 1 wherein said rate of temperature increase in said radiant section is at least about three times greater than the rate of temperature increase in said convection section.

3. The thermal processing unit of claim 1 wherein the temperature change of said plastisol in said radiant section is about 180° F. to about 230° F. and wherein the temperature change of said plastisol in said convection section is about 20° F. to about 115° F.

4. The thermal processing unit of claim 1 wherein the temperature change of said plastisol in said radiant section is at least about 1.5 times greater than the temperature change in said convection section.

5. The thermal processing unit of claim 1 wherein said radiant heat transfer section raises the temperature of a foamable plastisol to a temperature sufficient to initiate gellation of said foamable plastisol and said convection heat transfer section raises the temperature of foamable plastisol to a temperature sufficient to complete the gellation of said foamable plastisol.

6. The thermal processing unit of claim 1 wherein said radiant heat transfer section raises the temperature of a foamable plastisol to a temperature sufficient to initiate fusion and blowing of said foamable plastisol and said convection heat transfer section raises the temperature of foamable plastisol to a temperature sufficient to complete the fusion and blowing of said foamable plastisol.

7. A thermal processing unit for the processing of a plastisol-containing article used in the manufacture of plastisol-based floor coverings comprising:

a radiant heat transfer section for raising the temperature of said article at a first rate of temperature increase to an approach temperature, said section comprising radiant heat sources capable of rapidly cooling from a desired operating temperature to room temperature; and a separate convection heat transfer section following said radiant heat transfer section for raising the temperature of said article at a second rate of temperature increase from said approach temperature to a predetermined target temperature, said first rate of temperature increase being at least about three times greater than said second rate of temperature increase; and conveyor means which transport said foamable plastisol from said radiant transfer section to said convection heat transfer section.

8. The thermal processing unit of claim 7 wherein said radiant heat transfer section raises the temperature of said article at a rate of from about 20° F. per second to about 70° F. per second.

9. The thermal processing unit of claim 7 wherein said convection heat transfer section raises the temperature of said article at a rate of from about 2.5° F. per second to about 10° F. per second.

10. The thermal processing unit of claim 7 wherein said approach temperature is at least about 10° F. less then said predetermined target temperature.

11. A thermal processing unit for causing the fusion of a foamable plastisol used in the manufacture of a floor covering comprising:

a radiant heat transfer section for raising the temperature of the foamable plastisol at a rate of from about 20° F. per second to about 70° F. per second to an approach temperature at least about 10° F less than the fusion temperature of the plastisol covering, said section comprising radiant heat sources capable of rapidly cooling from a desired operating temperature to room temperature;

a separate convection heat transfer section following said radiant heat transfer section for raising the temperature of said plastisol at a rate of from about 2.5° F. per second to about 10° F. per second to about the fusion temperature of said plastisol; and conveyor means which transport said foamable plastisol from said radiant transfer section to said convection heat transfer section.

12. The thermal processing unit of claim 11 wherein said rate of temperature increase in said radiant section is at least about three times greater than the rate of temperature increase in said convection section.

13. The thermal processing unit of claim 11 wherein the temperature change of said plastisol in said radiant section is about 180° F. to about 230° F. and wherein the temperature change of said plastisol in said convection section is about 50° F. to about 125° F.

14. The thermal processing unit of claim 11 wherein the temperature change of said plastisol in said radiant section is at least about one and one-half times greater than the temperature change in said convection section.

15. A thermal processing unit to fuse a plastisol-containing article used in the manufacture of plastisol-based floor coverings comprising:

a radiant heat transfer section for raising the temperature of said article at a first rate of temperature increase to an approach temperature, said section comprising radiant heat sources capable of rapidly cooling from a desired operating temperature to room temperature;

a separate convection heat transfer section following said radiant heat transfer section for raising the temperature of said article at a second rate of temperature increase from said approach temperature to a predetermined target temperature, said first rate of temperature increase being at least about three times greater than said second rate of temperature increase wherein said convection heat transfer section is attached to said radiant heat transfer section; and conveyor means which transport said foamable plastisol from said radiant transfer section to said convection heat transfer section.

16. The thermal processing unit of claim 15 wherein said radiant heat transfer section raises the temperature of said article at a rate of from about 20° F. per second to about 70° F. per second.

17. The thermal processing unit of claim 15 wherein said convective heat transfer section raises the temperature of said article at a rate of from about 2.5° F. per second to about 10° F. per second.

18. The thermal processing unit of claim 15 wherein said approach temperature is at least about 10° F. less then said predetermined target temperature.

19. The thermal processing unit of claim 15 further comprising means for transporting said article from said radiant transfer section to said convection heat transfer section.

20. The thermal processing unit of claim 15 further comprising an exhaust hood section for removing waste gases generated during the processing of said article wherein said exhaust hood section is attached to said convection heat transfer section.

21. The thermal processing unit of claim 20 further comprising means for transporting said article from said radiant heat transfer section to said convection heat transfer section and from said convection heat transfer section to said exhaust hood section.

22. The thermal processing unit of claim 15 wherein said article is processed at a rate of from about 30 ft./min to about 180 ft./min.

* * * * *